United States Patent [19]

Rodgers

[11] 3,851,097

[45] Nov. 26, 1974

[54] METHOD AND APPARATUS FOR CONVEYING GRAPHIC INFORMATION OVER A TELEPHONE QUALITY COMMUNICATIONS LINK

[75] Inventor: James L. Rodgers, Tempe, Ariz.

[73] Assignee: Talos Systems, Inc., Scottsdale, Ariz.

[22] Filed: Apr. 3, 1973

[21] Appl. No.: 347,387

[52] U.S. Cl. .................................. 178/19, 179/2 DP

[51] Int. Cl. .............................................. G08c 21/00

[58] Field of Search ............ 325/39, 40, 47; 178/18, 178/19, 20; 179/2 DP, 15 BM

[56] References Cited

UNITED STATES PATENTS

| | | | |
|---|---|---|---|
| 3,342,935 | 9/1967 | Leifer et al. | 178/19 |
| 3,603,882 | 9/1971 | Wilson | 325/47 |
| 3,706,842 | 12/1972 | Robertson | 179/15 BM |
| 3,732,557 | 5/1973 | Evans et al. | 179/2 DP |

*Primary Examiner*—Thomas A. Robinson

*Attorney, Agent, or Firm*—Cahill, Sutton & Thomas

[57] ABSTRACT

A system is disclosed for transmitting and receiving either graphic or aural information over a telephone quality communications link. A manually operated writing pen senses a composite electrostatic field representing instantaneous X and Y dimension position information on a writing surface. The field components are generated by the wires of a grid beneath the writing surface, the wires of each dimension being driven in a predetermined phase distributed pattern. A phase locked loop for each dimension channel is resolved to minimum phase shift such that its frequency of operation directly represents position information in the dimension. The phase locked loops operate at sufficiently diverse frequencies as to avoid crosstalk and also permit derivation of a single composite signal by frequency modulating the higher frequency signal with the lower frequency signal which, itself, may be shifting in frequency. In the receive mode, the incoming signal is frequency and/or phase compared in the higher frequency phase locked loop to develop a signal having a d-c level representative of pen position in that dimension and also an a-c component representative of pen position in the lower frequency dimension. The latter signal is frequency and/or phase compared in the lower frequency phase locked loop to develop a signal having a d-c level representative of pen position in that dimension. The two d-c signals drive X and Y servo amplifiers which determine the position of a reproducing pen on the writing surface. Logic means provide for the establishment of a master/slave relationship in which, once one system has assumed the transmit mode, all others are locked in a receive mode. If none of the linked systems are in either the transmit or receive mode, normal aural communication may be carried out over the link.

5 Claims, 4 Drawing Figures

PATENTED NOV 26 1974 3,851,097

SHEET 3 OF 3

METHOD AND APPARATUS FOR CONVEYING GRAPHIC INFORMATION OVER A TELEPHONE QUALITY COMMUNICATIONS LINK

This invention relates to the communication arts and, more particularly, to means for transmitting and receiving highly accurate graphic representations through a relatively low quality communications link without sacrificing speed of transmission.

In the prior art transmission of graphic information, X and Y dimension information has been separated into two bands. Amplitude modulation is typically employed to encode instantaneous X and Y position information of an originating writing instrument. When this technique is utilized to transmit graphic information, particularly over a telephone quality communications link, a number of serious problems are encountered. The nominal passband of a telephone quality circuit is typically stated to be 300–3,000 hz. However, certain signalling operations necessary to the operation of a telephone system occupy the frequency range above about 2,200 hz. Thus, in a typical prior art system utilizing two discrete channels, a first carrier falls in the range 1,100–1,300 hz and a second carrier falls in the range 1,700–2,100 hz. Pen drop information is conveyed as a 120 hz sub-carrier. Because of the frequency ratios and corresponding harmonic relationship between the two carriers, it is difficult to keep the X and Y information separated. The pen drop signal is subject to the ubiquitous 120 hz interference. Actual frequency shift normally encountered in the communications link may amount to 2–10 hz which seriously affects the accuracy of the received information. The "cycles-per-inch" available limits the resolution of the reproduced graphic message.

These drawbacks, which are well known in the art, are eliminated or mitigated by the system of the present invention.

It is therefore a broad object of this invention to provide an improved system for establishing graphic communications between remote stations.

It is another object of this invention to provide a system which achieves such improvement notwithstanding utilization of a telephone quality communications link.

It is a more specific object of this invention to provide a system in which a single signal conveniently placed within the traditional telephone bandpass carries both X and Y dimension position information and also pen drop information.

Figure 1A:
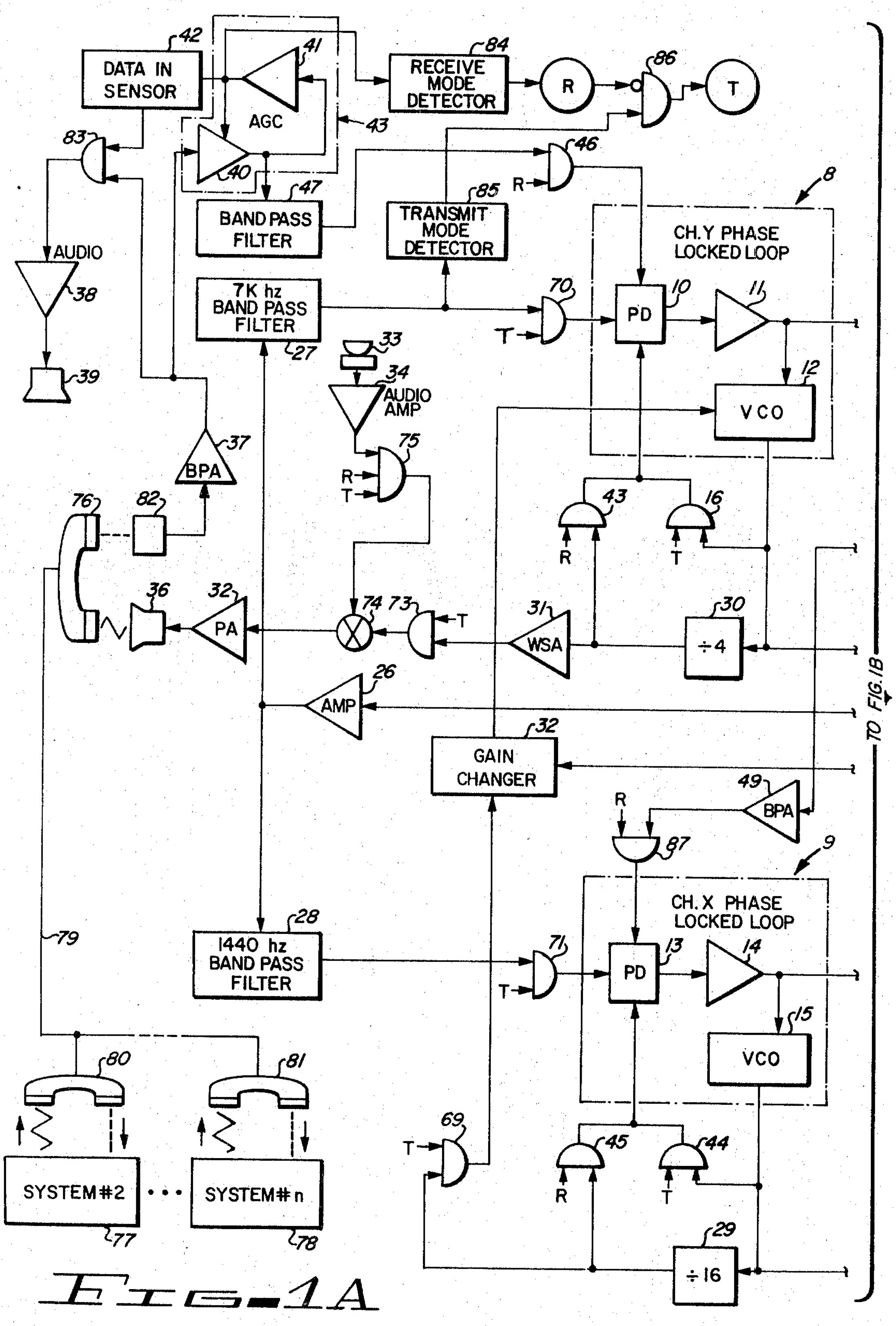
Figure 2:
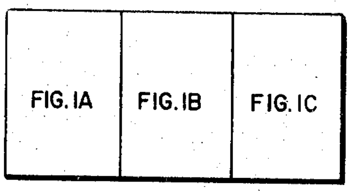
Figure 1B:
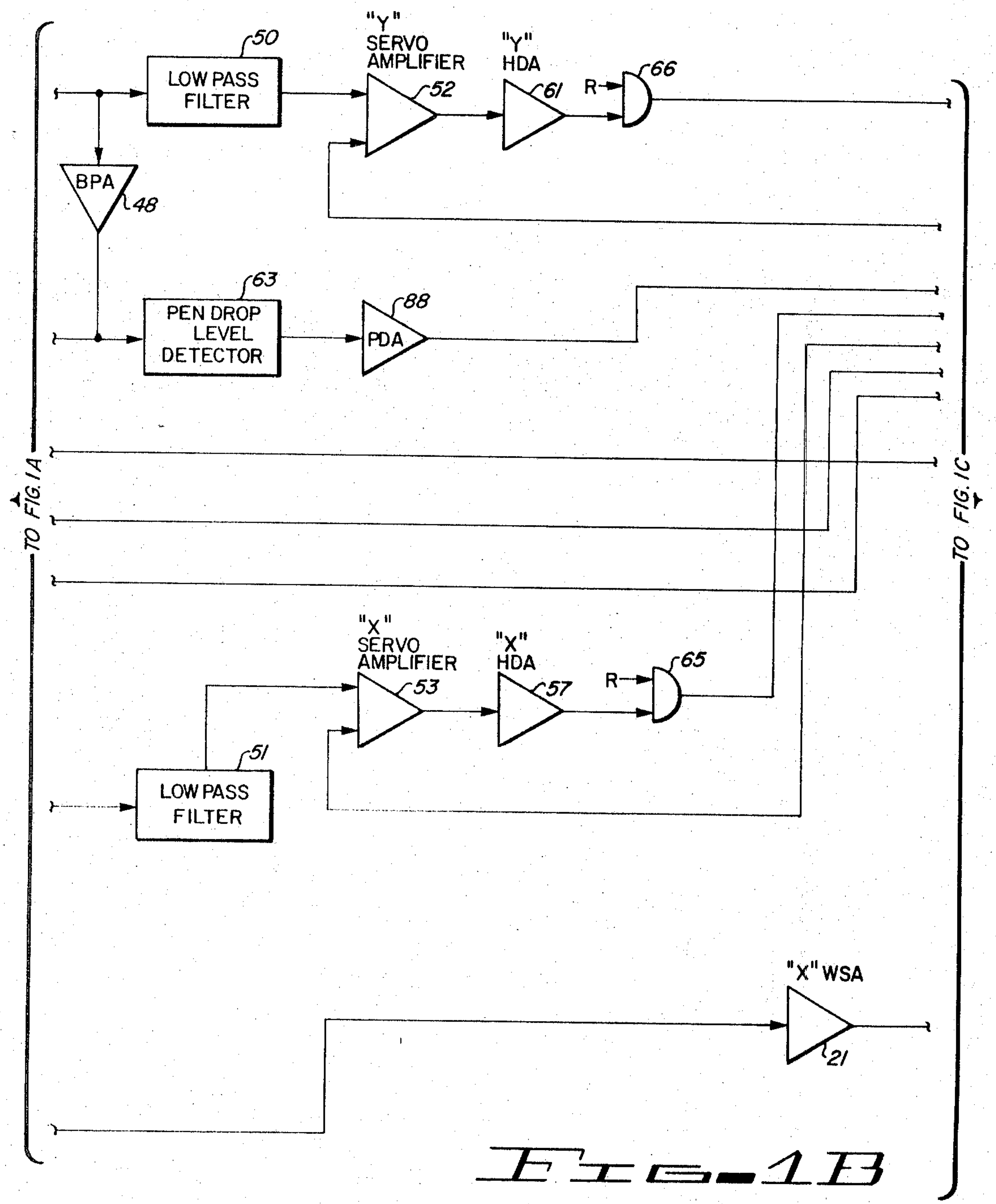
Figure 1C:
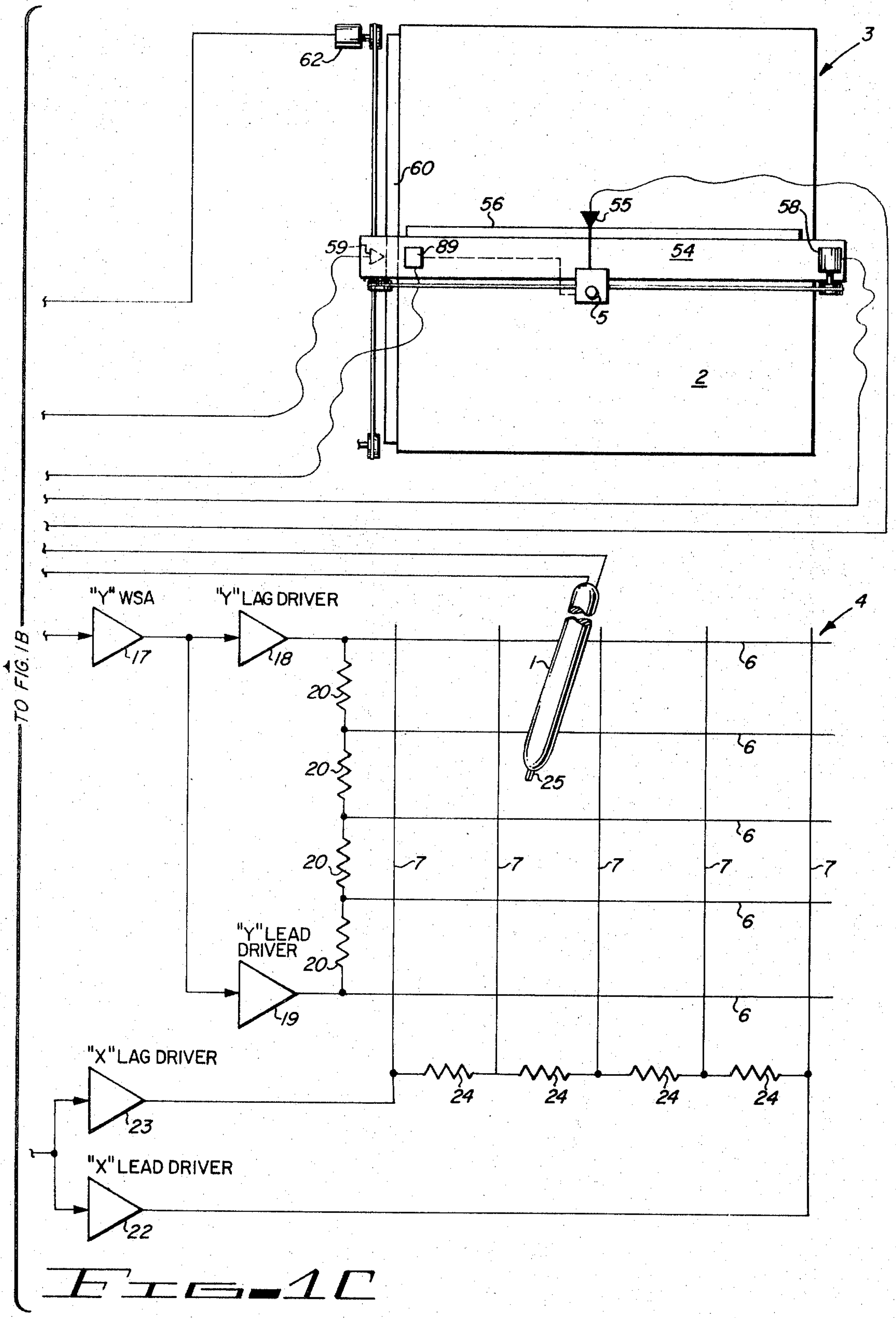

The subject matter of the invention is particularly pointed out and distinctly claimed in the concluding portion of the specification. The invention, however, both as to organization and method of operation, may best be understood by reference to the following description taken in connection with the accompanying drawings of which:

FIGS. 1*a*, 1*b*, and 1*c* are to be taken together as a single block diagram illustrating a presently preferred embodiment of the subject system; and FIG. 2 provides an indication of the manner in which the several components of FIG. 1 are to be disposed with respect to one another.

Certain elements of the system illustrated in FIG. 1 have been disclosed in U.S. Pat. applications Ser. No. 199,887, filed Nov. 18, 1971 entitled, "Apparatus For Converting The Position Of An Electrical Signal;" now U.S. Pat. No. 3,767,858 Ser. No. 253,859, filed May 16, 1972 entitled, "Electrical Writing Pen And Sensor;" and Ser. No. 286,557, filed Sept. 5, 1972 and now abandoned entitled, "Writing Mechanism."

By way of example, the manner in which information is encoded to correspond with the physical position of the writing pen 1 on the writing tablet 2 is set forth in detail in the above-mentioned U.S. Pat. No. 3,767,858. Referring now to FIGS. 1*a*, 1*b* and 1*c*, the reproducing mechanism 3 is shown separated from the wire grid 4 for convenience in explaining the instant invention. However, it will be understood that, in the actual apparatus, the writing surface 2 directly overlays the grid 4 in order that the writing pen 1 and the reproducing pen 5 both can mark directly on the writing surface 2 which typically constitutes a sheet of paper overlaying a hard substrate.

The present invention relates to the manner in which a plurality of systems according to the present invention may be coupled together through a telephone quality circuit such that a pictorial or written representation originating with a writing pen 1 of one such system is precisely reproduced by the reproducing pen 5 of one or more other systems. With the apparatus and method of the instant invention, a "master/slave" relationship is automatically established in such a manner that the roles can be readily reversed at the option of the operators. Spoken communication can be carried out in conjunction with the pictorial communication to further enhance the transfer of information.

As disclosed in detail in U.S. Pat. No. 3,767,858, the mechanical position of the writing pen 1 senses the phase of a composite field set up by the wire grid 4, which phase is unique to each pen 1 position on the writing surface 2. Each set of parallel conductors 6 and 7, which comprise the wire grid 4, is excited by a plurality of signals identical in frequency, but varying in phase in a predetermined sequence from conductor to conductor. The frequencies used to excite the two sets of parallel conductors are sufficiently different that they can be electrically separated after the composite field has been sensed by the pen 1 and passed into a Channel Y phase locked loop 8 and a Channel X phase locked loop 9. The phase locked loops serve to both develop the drive to the sets of parallel conductors and provide output signals representative of the pen position in each coordinate.

The Channel Y phase locked loop 8 includes a double balanced phase detector 10 having three inputs, an amplifier and filter 11 and a voltage controlled oscillator 12. Similarly, the Channel X phase locked loop includes a phase detector 13, an amplifier and filter 14, and a voltage controlled oscillator 15.

The operation of a phase locked loop is well documented in the literature and therefore need be discussed only briefly to provide an understanding of its utilization as a circuit element in the present invention. Referring to the Channel Y phase locked loop 8, the center frequency of the voltage controlled oscillator 12 may be predetermined by selecting timing components having appropriate values. If the d-c voltage issuing from the amplifier and filter 11 is at a predetermined level, then the voltage controlled oscillator 12 will operate at its nominal frequency. However, if the d-c voltage issued from the amplifier and filter 11 deviates in either direction from this predetermined value, the frequency of voltage controlled oscillator 12 shifts as a linear function of the voltage change.

The amplifier and filter 11 issues a d-c voltage in accordance with the signal it receives from phase detector 10. The signal issued by the phase detector 10 is directly related to the difference in frequency and/or phase, if any, between the reference signal received from the voltage controlled oscillator 12 (or a subharmonic thereof) and the input signal received from the bandpass filter 27 or the bandpass filter 47. If any frequency and/or phase difference exists, the voltage controlled oscillator reacts by shifting its frequency of operation to bring the input signals back into phase. Because of the complexity of phase locked loop circuitry, the use of integrated circuits such as type LM 565 manufactured by National Semiconductor Corporation are preferred at present.

The center frequency of the Channel Y voltage controlled oscillator 12 is selected to be nominally 7 khz and that of the corresponding voltage controlled oscillator 15 in the Channel X phase locked loop 9 is 1,440 hz. The output signal from the voltage controlled oscillator 12 is applied to the phase detector 10 through electronic switch 16 when the apparatus is operating in the transmit mode and also to a wave shaping amplifier 17 which drives Channel Y lead driver 19 and Channel Y lag driver 18. The Channel Y lag driver 18 serves to shift the phase of the input signal thereto by a predetermined amount in the lag direction. Similarly, the Channel Y lead driver shifts the signal ahead through an identical angle. Channel Y resistors 20 serve to algebraically spread the resultant phase shift equally (or in some other predetermined distribution) such that the time varying voltages applied to the open ended conductors 6 at junctions of the resistors 20 will each have a unique phase relationship to the signal received from the voltage controlled oscillator 12.

Correspondingly, a signal from the voltage controlled oscillator 15 of the Channel X phase locked loop 9 is passed through the Channel X wave shaping amplifier 21 and through Channel X lead driver 22 and Channel X lag driver 23 such that the cumulative phase difference is algebraically distributed among the X wires 7 by means of Channel X resistors 24 whereby the time varying voltage applied to each of the wires 7 has a unique phase relationship to the signal received from the Channel X voltage controlled oscillator 15. In accordance with the well known laws of electrostatics, a field will be generated about each of the wires 6 and 7, and the signal sensed by the writing pen 1 will be an instantaneous summation of the electrostatic fields generated by all the wires 6 and 7 according to their amplitudes at the position of the pen point 25.

The pen point 25 of the writing pen 1 functions as an antenna picking up a composite electrostatic field signal generated from the X and Y wires. Reference may be had to the above-mentioned U.S. Pat. application Ser. No. 253,859 for a discussion of writing pen details suitable for use in the present environment. The signal sensed by the pen point 25 is coupled o the input to an amplifier 26. The output signal from the amplifier 26 is impressed on the input terminals of bandpass filters 27 and 28 which drive, respectively, inputs to electronic switches 70 and 71 which are actuated by the presence of a Transmit ("T") signal appearing at the control inputs thereto. The origin of the "T" and corresponding Receive ("R") will be discussed below. The output signals from electronic switches 70 and 71 drive, in turn, first inputs to the Channel Y phase locked loop phase detector 10 and the Channel X phase locked loop phase detector 13. The characteristics of the filters 27 and 28 are selected to pass signals in the frequency range across which the respective voltage controlled oscillators of the phase locked loops 8 and 9 operate.

The output from the 7 khz bandpass filter 27 is also coupled to transmit mode detector 85 which may be simple level detector logic utilized to develop the "T" signal. When the pen point 25 approaches to within about an inch of the wire grid 4, the level of the signal observed at the output of the bandpass filter 27 will cause the transmit mode detector 85 to issue a signal applied to electronic switch 86. Electronic switch 86 is also responsive to the "R" signal in such a manner that it is actuated in the absence of the "R" signal; i.e., by an "$\bar{R}$" signal. Thus, the output from the electronic switch 86 may be utilized to develop the "T" signal which, however, cannot be present if an "R" signal has already been established. The reason for this interaction will become more apparent as the description of the invention proceeds.

In order to segregate the X and Y position information, it is necessary that the X and Y voltage controlled oscillators in the corresponding phase locked loops 21 and 20 function in well separated frequency bands. For example, in a presently preferred embodiment, the center frequency of the Channel Y voltage controlled oscillator 12 is 7 khz, and that of the corresponding voltage controlled oscillator 15 in the Channel X phase locked loop is 1,440 hz. Therefore, the bandpass filters 27 and 28 are centered at 7 khz and 1,440 hz, respectively.

Consider now a condition in which the pen point 25 is situated as illustrated in FIG. 1*c*; i.e., just above the center Y wire 6 and just to the left of the center X wire 7 and assume a "T" mode. As a result, the electrostatic signal sensed by the pen point 25 is made up of components in the Y direction which lag the signal from the Channel Y wave shaping amplifier 17 and also lag the signal issued by the Channel X wave shaping amplifier 21. The signal from the pen 1, amplified through the amplifier 26, is separated into X and Y components by the bandpass filters 28 and 27, respectively. The Y component is impressed on the phase detector 10 of the Channel Y phase locked loop 8. The phase detector 10, in comparing the phases of this signal and the reference signal received from the voltage controlled oscillator 12 (passed by electronic switch 16), observes a phase difference. The phase detector 10 responds to this sensed phase difference by developing an error signal through the amplifier and filter 11 which is applied to the voltage controlled oscillator 12 to bring about a decrease in frequency sufficient to restore the Channel Y phase locked loop to a naturally sought condition. On the other hand, the X component of the field sensed by the pen point 25 lags the input signal to the drivers 22 and 23 such that the Channel X voltage controlled oscillator 15 is shifted to a lower frequency to restore the phase shift condition naturally sought by the Channel X phase locked loop 9.

The above background information is discussed in more detail in the above referenced U.S. Pat. No. 3,767,858.

The invention, in a presently preferred embodiment, finds a highly advantageous application in coupling the pen position information to remote apparatus over a single low quality channel such as a conventional telephone circuit. In order to carry out this specific function, the Channel X and Channel Y information is combined into a frequency-modulated signal with a shifting carrier frequency. The output signal from the Channel X phase locked loop 9 is passed through a frequency divider 29 which performs a frequency division of 16. Therefore, the output signal from the frequency divider 29 will be frequency varied about a center frequency of 90 hz. This Channel X frequency divided information is applied through electronic switch 69, as a separate input to the Channel Y voltage controlled oscillator 12 such as the timing input to the above mentioned integrated circuit phase locked loop. This serves to frequency-modulate the instantaneous Channel Y frequency. With this arrangement, the average frequency at which the channel Y voltage controlled oscillator 12 functions is not affected by the Channel X information.

The ouput signal from the Channel Y voltage controlled oscillator 12 therefore has a nominal frequency primarily determined by the position of the pen point 25 in the Y direction with a further frequency shift component attributable to the X position of the pen point 25. The output signal from the Channel Y phase locked loop 8, centered about 7 khz, is passed through a frequency divider 30 which divides the instantaneous frequency by four to provide an output to an amplifier 31 having a center frequency of 1,750 hz which is in a useable portion of the conventional telephone circuit bandwidth. As the pen 1 is manipulated on the writing tablet 2, the instantaneous frequency of the signal issued by the amplifier 31 will vary in the range 1,500–2,000 hz in accordance with the Y position information and will vary instantaneously in accordance with X position information. The division of Channel Y information by four does not result in a corresponding division of the Channel X modulation rate on Channel Y because the Channel X modulation represents a rate of frequency change of the Channel Y nominal frequency. This rate of frequency change is not divided as is the nominal Channel Y frequency.

An indication must be provided in the transmitted signal as to whether the pen point 25 is bearing on the surface of the writing tablet 2 in order that the reproducing pen 5 of a system being communicated with will drop onto its writing surface. This function is achieved by gain changer 32 that responds to closure of a miniature switch (see previously mentioned U.S. Pat. application Ser. No. 253,859) to increase the amplitude of the signal (and therefore the modulation index which improves the signal-to-noise ratio at the receive end) applied from the divide by sixteen circuit 29 to the voltage controlled oscillator 12 twofold.

The signal issued from the divide by four circuit 30, varying about 1,750 hz, passes through waveshaping amplifier 31 which covers a range encompassing somewhat greater than 1,500–2,000 hz (to pass all important frequency components) and is impressed on an input terminal of electronic switch 73 which is enabled by the "T" signal. The signal passed through the electronic switch 73 is then impressed on a first input to summing junction 74. An audio signal is developed by microphone 33 from speech or the like and is amplified by audio-amplifier 34 which has its output terminals connected to an input terminal of electronic switch 75. Electronic switch 75 is connected in such a manner that the presence of either a "T" or "R" signal provides a disabling function in order that speech or the like cannot interfere with pen position information. The audio output signal from the electronic switch 75 is impressed on a second input to summing junction 74. The information issued by the summing junction 74, either speech or the like or pen position information, is impressed on the input terminals of power amplifier 32. Therefore, the power amplifier 32 passes either encoded information describing the instantaneous position of the writing pen 1 or audio information, such as speech, to audio-signal-to-sound transducer 36.

Transducer 36 is acoustically coupled to telephone handset 76 to transmit information to one or more remote systems 77 and 78 by means of telephone quality circuit 79 and remote handsets 80 and 81. It will be apparent to those skilled in the art that the illustrated system and the remote systems 77 and 78 could be hard wired or that another type of communications link, such as wireless, could be utilized. Additionally, information can be stored on an ordinary audio recorder for later reproduction of a graphic and/or aural message.

Assume now that the system is not transmitting, but is receiving a signal from a similar system which passes through the telephone quality link 79 to handset 76. The incoming audio signal is detected by audio-to-electrical-signal transducer 82 (microphone, magnetic pickup or the like) and processed by bandpass amplifier 37 which has a nominal frequency passband of 300–3,000 hz. Since the incoming signal may carry audio information such as speech, the output from the bandpass amplifier 37 is applied to the input terminals of audio amplifier 38, through electronic switch 83, which drives speaker 39 or a similar transducer. Additionally, the output signal from the bandpass amplifier 37 is applied to AGC circuit 43 including amplifier 40 to which feedback is applied by feedback amplifier 41. In the manner well known in the art, the AGC serves to stabilize the amplitude of the signal appearing at the output terminals of the AGC amplifier 40 in the event of amplitude variations in the received signal. The AGC circuit including amplifiers 40 and 41 may be substituted with an equivalent such that other methods of frequency and amplitude discrimination can be utilized to indicate a difference between received data and received noise. Receive mode detector 84, which may be a straightforward level detector, serves to develop the "R" signal which is utilized throughout the apparatus to actuate certain electronic switches.

The frequency response characteristics of the loop including AGC amplifier 40 and feedback amplifier 41 are adjusted to respond in the frequency range 1,500–2,000 hz. Hence, a sufficient signal in this frequency range indicates the presence of pen position information in the incoming signal rather than voice information of which the principal components are at a much lower frequency. Therefore, the output signal from the feedback amplifier 41 is also applied to data-in sensor 42 which may be simple level detector logic utilized to apply an audio disable signal to electronic switch 83.

The stabilized pen position information signal issued from the AGC amplifier 40 is applied to another bandpass filter 47 which may advantageously be stagger tuned to achieve rather abrupt bandpass characteristics outside of the range 1,500–2,000 hz to achieve minimum phase shift distortion within the range of 1,500–2,000 hz. Electronic switch 46 couples the output from the bandpass filter 47 to the third input of the Channel Y phase locked loop phase detector 10 when the apparatus is operating in the "R" mode.

With the electronic switches 43, 45 and 46 actuated by the "R" signal, the divide-by-sixteen circuit 29 is placed directly between the output of the Channel X phase locked loop voltage controlled oscillator 15 and the reference input to phase detector 13. Similarly, the divide-by-four circuit 30 is placed between the output of the Channel Y voltage controlled oscillator 12 and the reference input to phase detector 10. It will be recalled that the center frequency of the Channel Y voltage controlled oscillator 12 is 7 khz frequency modulated, in the transmit mode, by a signal from the divide-by-sixteen circuit 29. However, a transmitted signal is divided-by-four by the circuit 30 such that an incoming signal from a remote system 77 or 78 applied to the Channel Y phase detector 10 operating in the receive mode is centered about 1,750 hz. It is therefore necessary to divide the output frequency of the voltage controlled oscillator 12 by four to achieve a valid frequency and/or phase comparison when the apparatus is receiving. Thus, in the receive mode, the output signal from the Channel Y amplifier and filter 11 will have a d-c level corresponding to the Y position of the transmitting pen and will also carry X position information in the form of a signal varying about 90 hz.

The X information signal is conditioned through 70–110 hz bandpass amplifiers 48 and 49 (having broad and narrow bandpass characteristics, respectively) and applied, through electronic switch 87 to a third input to the Channel X phase locked loop phase detector 13. The output from the Channel X phase locked loop voltage controlled oscillator 15 is divided by 16 through the circuit 29 and passed through electronic switch 45 to provide a corresponding reference signal to the phase detector 13. Therefore, the d-c output from the Channel X phase locked loop amplifier and filter 14 represents X position information originating at the manually operated pen of the transmitting system.

The respective d-c components issued from the Channel Y phase locked loop 8 and the Channel X phase locked loop 9 are conditioned by low pass filters 50 and 51, respectively. It has been found that nominal cutoff frequencies of 15 hz or less permits sufficiently rapid movement of the reproducing mechanism. The output signals from the low pass filters 50 and 51 are applied, respectively, to input terminals of Channel Y servo amplifier 52 and Channel X servo amplifier 53.

From a study of the above referenced U.S. application Ser. No. 286,557, it will be understood that the reproducing pen 5 translates in the X direction on a carriage 54 and carries a wiper 55 which slides along linear potentiometer 56. Thus, an indication of the instantaneous X position of the reproducing pen 5 may be fed back to the Channel X servo amplifier 53 for comparison with the received and decoded signal. The output from the Channel X servo amplifier passes through actuated electronic switch 65 and is amplified by X motor drive amplifier 57 to appropriately energize X dimension motor 58 until the input signal from the wiper 55 to the Channel X servo amplifier 53 corresponds to the X position specified by the signal from the low pass filter 51.

Similarly, a second wiper 59, positioned on the carriage 54, rides along stationary linear potentiometer 60 to develop a signal indicative of the Y position of the carriage 54 and hence the reproducing pen 5. The Y position signal is fed back to the Channel Y servo amplifier 52 and the output signal therefrom passed through actuated electronic switch 66 and amplified by Y motor drive amplifier 61, energizes Y dimension motor 62 to move the entire carriage 54 in the Y dimension until the two inputs to the Channel Y servo amplifier 52 correspond.

As previously indicated, a system operating in the transmit mode provides an indication of pen drop by increasing the amplitude of the X position signal before it is utilized to frequency modulate the Y position signal. In the receive mode, the change in amplitude of the X position signal is sensed at the output of bandpass amplifier 48 by pen drop level detector 63. The output from pen drop level detector 63 is amplified by pen drop solenoid amplifier to actuate solenoid 89 to bring pen 5 into contact with the writing surface.

It will be observed from a consideration of the manner in which the "R" and "T" signals are derived, that once a single system is operating in the transmit mode, the state of electronic switches 43, 45, 46, 65, 66 and 87 in all receiving systems places them into a "slave" mode in which they can reproduce, but not transmit, written material. When the operator of the temporary "master" lifts his writing pen 1 sufficiently from the writing tablet 2, the signal received by the "slave" will have no components in the frequency range 1,500–2,000 hz to maintain the relationship. As a result, the first operator to place his writing pen 1 proximate the writing tablet 2 becomes the "master." When the master/slave relationship is established, the reproducing pen 5 of all slave systems will follow the movement of the master writing pen 1 even before actual contact of the pen point 25 with the writing surface. Therefore, each of the reproducing pens 5 will be immediately above their proper starting position when pen drop is established. In this manner, various operators remote from one another can contribute to the written or drawn material which will be reproduced at all stations. While the principles of the invention have now been made clear in an illustrative embodiment, there will be immediately obvious to those skilled in the art many modifications of the structure, arrangement, proportions, the elements, materials, and components used in the practice of the invention which are particularly adapted for specific environments and operating requirements without departing from those principles.

I claim:

1. Apparatus for encoding graphic information into a single signal comprising:

A. a writing pen;

B. a writing surface;

C. first variable frequency means coupled to said pen and responsive to the position of said pen in a first dimension to assume a first operating frequency corresponding thereto, said first variable frequency means having a first predetermined range about a first center frequency;

D. second variable frequency means coupled to said pen and responsive to the position of said pen in a second dimension to assume a second operating frequency corresponding thereto, said second variable frequency means having a second predetermined range about a second center frequency differing from said first center frequency;

E. a first frequency divider coupled to the output of said first variable frequency means for deriving a subharmonic of said first operating frequency; and F. means coupling said first frequency divider to said second variable frequency means for frequency modulating said second operating frequency with said sub-harmonic of said first operating frequency.

2. The apparatus of claim 1 which further includes gain changer means responsive to contact between said writing pen and said writing surface to increase the amplitude of said sub-harmonic of said first operating frequency whereby the modulation index of said second operating frequency is increased to provide an indication of pen drop.

3. The apparatus of claim 1 which further includes a second frequency divider coupled to the output of said second variable frequency means for deriving a subharmonic of said second operating frequency.

4. The apparatus of claim 2 which further includes a second frequency divider coupled to the output of said second variable frequency means for deriving a subharmonic of said second operating frequency.

5. The apparatus of claim 1 in which said first and second variable frequency means include, respectively:

A. a first phase locked loop having a first variable frequency oscillator and a first phase detector; and B. a second phase locked loop having a second variable frequency oscillator and a second phase detector.

* * * * *